Sept. 8, 1953
M. A. LALANDE
2,651,760
RETARDATION LINE SUBDIVIDED INTO SECTIONS
Filed Dec. 8, 1949
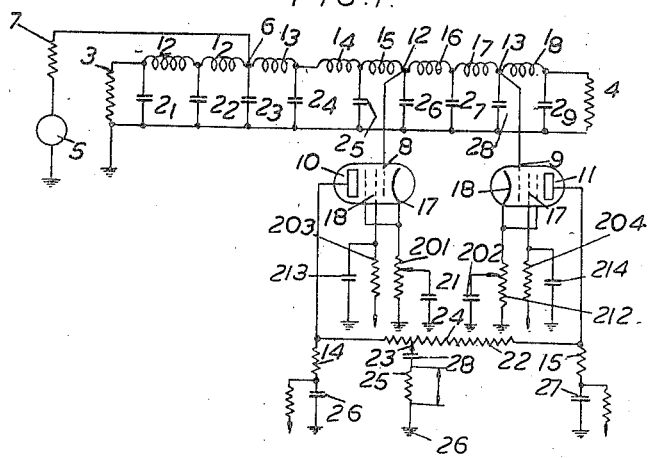
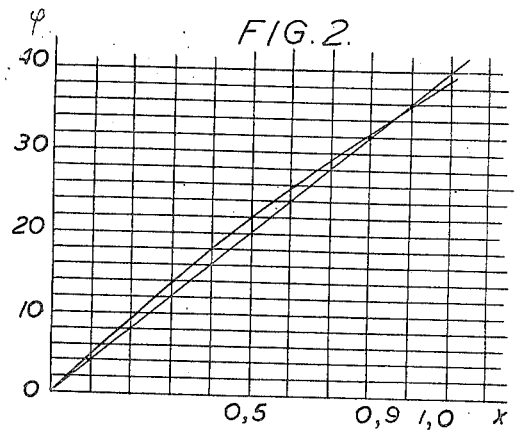
Inventor
MARC ANDRE LALANDE
By Philip M. Bolton
Attorney Patented Sept. 8, 1953

2,651,760

UNITED STATES PATENT OFFICE 2,651,760

RETARDATION LINE SUBDIVIDED INTO SECTIONS

Marc André Lalande, Paris, France, assignor to International Standard Electric Corporation, New York, N. Y., a corporation of Delaware Application December 8, 1949, Serial No. 131,764
In France December 10, 1948

2 Claims. (Cl. 333—29)

The present invention relates to electric delay lines provided with means for dividing the line into sections; such lines may be used for introducing into a circuit a predetermined transmission time or for measuring transmission time.

In the technique of telecommunication it is often necessary to make use of delay lines either for introducing into a circuit a predetermined transmission delay or for measuring transmission time.

These delay lines are generally constituted by a number of sections each section introducing the same amount of delay, this does not permit variations of the transmission time in a continuous fashion. On the other hand, delay lines are not well adapted to the use of a sliding contact which would only give a discontinuous delay variation when it is moved from section to section of the delay line.

One of the objects of the present invention is to overcome these drawbacks while providing a device which gives a continuous delay variation between two tappings of a delay line comprising sections each of which introduces a same amount of delay.

According to a feature of the invention there is provided a device comprising in combination a delay line including several identical sections, each section introducing the same amount of delay, means for connecting the said delay line to a current source supplying a sinusoidal voltage, two tubes such as pentode tubes the control grids of which are connected respectively to the two opposite extremities of two consecutive sections of the said delay line, a potentiometer placed between the anodes of the two pentodes tubes, the phase of the voltage tapped by means of the sliding member of the said potentiometer varying in a continuous fashion during the displacement of the said sliding members.

Other features and advantages of the invention will appear from a consideration of the following description of an embodiment of the invention illustrated in the accompanied drawings in which:

Fig. 1 represents a schematic diagram of an embodiment incorporating features of the invention.

Fig. 2 is a diagram used in the description.

In Fig. 1, inductances, $l_1$, $l_2$, $l_3$, $l_4$, $l_5$, $l_6$, $l_7$, $l_8$ and condensers $2_1$, $2_2$, $2_3$, $2_4$, $2_5$, $2_6$, $2_7$, $2_8$, $2_9$, constitute a well known delay line, wound to form identical sections and terminated by impedances 3 and 4. A source 4 of sinusoidal current is connected to a tapping 6 of the delay line. Let $R_0$ be the value of each of the impedances 3 and 4 and $R_0/2$ the impedance of source 5; this impedance is represented schematically in 7. The grids 8 and 9 of the two pentodes 10 and 11 are electrically connected to two tappings 12 and 13 on the delay line. The tapping 13 is established on the last section of the delay line and the tapping 12 two sections ahead. In the anode circuit of each one of the pentodes 10 and 11 are placed equal load resistances 14 and 15. Let $R_2$ be the value of each one of these resistances. The screen grids 16 and 17 and the cathodes 18 and 19 of the pentodes 10 and 11 are biased by means of condensers and resistances $20_1$, $21_1$, $20_2$, $21_2$, $20_3$, $21_3$, $20_4$, $21_4$. The load resistances 14 and 15 are interconnected on the anode side by a potentiometer 22 the resistance of which is $2R_1$. The position of sliding member 23 of potentiometer 22 is defined by the distance $x$ (positive towards the left hand side on the figure) separating the middle 24 of the potentiometer resistance 22 and sliding member 23. A resistance 25 of value $R_3$ is connected between the sliding member 23 and ground 26. Condensers 26, 27, 28, the reactance of which is negligible at the working frequencies compared to the value of the resistances connected in series with these condensers, are direct current blocking condensers.

The following considerations show that such a device permits a continuous variation of the transmission time introduced by the delay line.

Let current source 5 supply a sinusoidal voltage:

$$E = E_0 \cos \omega t$$

the voltages at points 12 and 13 will, supposing the delay line give no attenuation, be:

$$U_1 = \frac{E_0}{2} \cos (\omega t + (n-1)\varphi_1) = \frac{E_0}{2} \cos (\omega t' - \varphi_1)$$

$$U_2 = \frac{E_0}{2} \cos (\omega t + (n+1)\varphi_1) = \frac{E_0}{2} \cos (\omega t' + \varphi_1)$$

$\varphi_1$ being the phase angle given by one section of the delay line, and $\omega$ the pulsation of the alternating current provided by source E.

If $S_1$ and $S_2$ designate the gain of the tubes 10 and 11 and $E_3$ the voltage between sliding member 23 and ground, resistance 25 being omitted, the following value is obtained for $E_3$:

$$E_3 = \frac{S_1 U_1 R_2 [R_2+(1-x)R_1] + S_2 U_2 R_2 [R_2+(1+x)R_1]}{2(R_2+R)}$$

$$E_3 = \frac{E_0}{4} \frac{R_2}{R_2+R_1} \left[ S_1^2[R_2+(1-x)R_1]^2 + S_2^2[R_2+(1+x)R_1]^2 \ldots + 2S_1 S_2 [(R_2+R_1)^2 - x^2 R_1^2] \right] \cdot \cos(\omega t + n\varphi_1 + n\varphi_2)$$

with $$\text{Tan } \varphi_2 = \text{Tan } \varphi_1 \frac{(R_2+R_1)(S_2-S_1) + xR_1(S_2+S_1)}{(R_2+R_1)(S_2+S_1) + xR_1(S_2-S_1)}$$

and the impedance of this source will be a pure resistance:

$$R = \frac{R_2+R_1}{2} \left[ 1 - \left( \frac{x}{1+\frac{R_2}{R_1}} \right)^2 \right]$$

It is obvious that the load constituted by resistance 25 will not change the phase of the voltage between sliding member 23 and ground 26 but only the modulus of the voltage.

In practice, $S_2$ will be made equal to $S_1$ for example by introducing a negative feedback in the cathodes of the pentodes 10 and 11.

If $S_1 = S_2 = S$, $E_3$ becomes $E'_3$ and $\varphi_2$ becomes $\varphi'_2$ and thus:

$$E'_3 = \frac{E_0}{2} \frac{SR_2}{2} \sqrt{2\left(1 + \cos 2\varphi_1 + \left(\frac{x}{1+\frac{R_2}{R_1}}\right)^2 (1-\cos 2\varphi_1)\right)} \cdot \cos(\omega t + n\varphi_1 + n\varphi'_2)$$

$$\text{Tan } \varphi'_2 = \frac{x}{1+\frac{R_2}{R_1}} \text{Tan } \varphi_1$$

It is necessary that the variation of $\varphi_2$ be at least equal to $$\pm \frac{\varphi_1}{2}$$

in order that any value of the phase angle can be reached, the delay line varying by steps equal to $\varphi_1$, and therefore:

$$\frac{1}{1 \pm \frac{R_2}{R_1}} \text{Tan } \varphi_1 \geq \text{Tan } \frac{\varphi_1}{2} \text{ or } R_1 \geq R_2 \cos \varphi_1$$

If there is fixed the value $$\frac{\varphi_1}{2}$$

to be reached for $x = x_1$, there is obtained:

$$\frac{R_2}{R_1} = \frac{2x_1}{1 - \text{Tan } \frac{2\varphi_1}{2}} - 1$$

In practice, delay lines are not used beyond half their cut-off frequencies, thus giving for $\varphi_1$ a maximum value of 72°. If $x_1 = 0.9$ there is obtained:

$$\frac{R_2}{R_1} = 2.81 \text{ and Tan } \Phi_2 = 0.806x$$

The variation of $\varphi_2$ in function of $x$ is represented in Figure 2 for this extreme case. This variation is nearly the same as the straight line passing through 36° for $x = 0.9$.

For values of $\varphi_1$ three or four times smaller the variation will be practically linear for all the span of variation of $x$.

In the case in which $S_2$ is slightly different from $S_1$ for example $S_2 = 1.1 S_1$ and wherein $\varphi_2$ and $\varphi_1$ may be confused with their tangent one is led to take the following values:

$$R = 1.5 R_2 \text{ or } \varphi_2 = \frac{\varphi_1}{2} \text{ for } x = 0.83$$

and in a general fashion:

$$\varphi_2 = \varphi_1 \frac{0.25 + 1.65x}{2.75 + 0.15x}$$

Thus giving for coefficient $\varphi_1$ the following values for:

$x = -1$ —0.53 instead of —0.60
$x = -0.83$ —0.43 instead of —0.50
$x = -0$ +0.090 instead of —0.00
$x = +0.83$ +0.57 instead of +0.50
$x = +1$ +0.66 instead of +0.60

This is equivalent to a translation of the scale of $\varphi_2$ from 6.0 to 9.0 per cent of the value of $\varphi_1$. This transmission may be experimentally determined by searching the position of the sliding member which gives the same phase angle as the tapping on the delay line intermediate between 12 and 13 which corresponds to $\varphi_2 = 0$.

In the present description there has been assumed that the difference in amplitude of the signals delivered by pentodes 9 and 10 resulted only from a difference in the gain of the tubes.

If things were different, it would be necessary to bring these amplitudes to the same value, for example by introducing negative feed backs of suitable values into the circuits of the cathode, the computation necessitating the equality of the modulus of $S_1$, $U_1$ and of $S_2$, $U_2$ and not merely of $S_1$ and $S_2$ the reasoning and the conclusion being otherwise unchanged.

The invention is not limited to the above described embodiment, it is on the contrary capable of many alternatives and modifications which will appear clearly to those skilled in the art.

What is claimed is:

1. An electrical delay line comprising a number of serially connected sections, input means for applying sinusoidal electrical energy on one of said sections, a terminating impedance for the last section of said delay line, two tapping leads associated respectively with sections of said delay line intermediate said input means and said terminating impedance, amplifying means provided on each one of said tapping leads and having equal resistances $R_2$ in the outputs thereof, potentiometer means bridging the outputs of said amplifying means whereby the delay of the electrical energy on said first tapping lead with respect to the delay of the electrical energy on a variable tapping lead of said potentiometer means is variable according to the adjustment of said potentiometer means, the values of said resistances $R_2$ being related to the resistance $2R_1$ of said potentiometer means by the relation:

$$\frac{R_2}{R_1} = 2.81$$

whereby a continuous and substantially linear variation of electrical delay is obtained in function of said potentiometer means adjustment.

2. A phase shifter comprising a delay line having a plurality of serially connected sections, means for impressing an electric wave on said delay line, a terminating impedance connected to an end of said line, a pair of vacuum tubes each including input and output electrodes, means connecting the input electrode of one of said tubes to a first point on said line, means connecting the input electrode of the other of said tubes to a second point on said line having an electrical phase different from said first point, a first resistance connected in series with the output electrode of one of said tubes, a second resistance substantially equal to said first resistance connected in series with the output electrode of the other of said tubes, a third resistance connected between the output electrode of said one tube and the output electrode of said other tube an output terminal adjustably connected to said third resistance, each of said substantially equal resistances having a value substantially equal to 2.81 times one-half the value of said third resistance.

MARC ANDRÉ LALANDE.

References Cited in the file of this patent

UNITED STATES PATENTS

| Number | Name | Date |
| --- | --- | --- |
| 2,231,955 | Schrader | Feb. 18, 1941 |
| 2,263,376 | Blumlein et al. | Nov. 18, 1941 |
| 2,265,996 | Blumlein | Dec. 16, 1941 |
| 2,419,894 | Hayes | Apr. 29, 1947 |
| 2,441,334 | Sayer | May 11, 1948 |

FOREIGN PATENTS

| Number | Country | Date |
| --- | --- | --- |
| 466,092 | Great Britain | May 21, 1937 |